United States Patent [19]

Smith

[11] Patent Number: 4,490,657
[45] Date of Patent: Dec. 25, 1984

[54] AUTOMATIC TORQUE TAPER CIRCUIT

[75] Inventor: Enoch P. Smith, Greendale, Wis.

[73] Assignee: Allen-Bradley Company, Milwaukee, Wis.

[21] Appl. No.: 540,529

[22] Filed: Oct. 11, 1983

[51] Int. Cl.³ .............................................. H02P 5/06
[52] U.S. Cl. .................................... 318/434; 318/326; 318/432
[58] Field of Search ............... 318/434, 432, 433, 430, 318/431, 257, 326, 327

[56] References Cited

U.S. PATENT DOCUMENTS

| 3,735,226 | 5/1973 | Pittner | 318/432 X |
| 3,906,319 | 9/1975 | Milligan | 318/327 X |
| 3,935,520 | 1/1976 | Johnson | 318/326 X |
| 4,109,190 | 8/1978 | McNaughton | 318/326 X |
| 4,156,162 | 5/1979 | Warfield et al. | 318/434 |
| 4,217,527 | 8/1980 | Bourke et al. | 318/434 X |
| 4,260,938 | 4/1981 | Joyes | 318/434 |
| 4,268,781 | 5/1981 | Kawada et al. | 318/434 |

FOREIGN PATENT DOCUMENTS

| 57-68693 | 4/1982 | Japan | 318/434 |
| 1544531 | 4/1979 | United Kingdom | 318/257 |
| 2017975 | 10/1979 | United Kingdom | 318/327 |

Primary Examiner—Stanley J. Witkowski
Assistant Examiner—Bentsu Ro
Attorney, Agent, or Firm—Barry E. Sammons

[57] ABSTRACT

A dc motor drive includes a current limit circuit which produces a current limit signal that inhibits motor current to its commutation limit over a wide speed range. The current limit circuit includes an analog divider circuit which produces an output signal which decreases as an inversed function of motor speed.

4 Claims, 4 Drawing Figures

AUTOMATIC TORQUE TAPER CIRCUIT

BACKGROUND OF THE INVENTION

The field of the invention is motor control circuits, and particularly, control circuits which limit the amount of drive current to match the commutation limits of the motor.

The maximum current which a commutating motor can withstand varies as a function of speed. Control circuits for such motors include current limit circuits which prevent the current delivered by the motor control from exceeding the commutation limits of the motor. As shown in FIG. 3, the simplest of the prior control circuits limits the motor current at a fixed value regardless of motor speed, as shown by the straight line 1. More sophisticated motor controls provide current limiters which establish sloped current limit curves as shown by the tapered lines 2 and 3.

The actual commutation limits of a family of motors are usually published by the motor manufacturer, and these take the form of a "constant horsepower" curve which is hyperbolic in shape. While the multiple sloped commutation limit indicated by curve 3 in FIG. 1 may approximate such a constant horsepower curve, the establishment of such a curve involves the making of many adjustments to tailor the curve to each motor in the family. The more closely the multiple slope curve is made to approximate a constant horsepower curve the more adjustments which must be made.

SUMMARY OF THE INVENTION

The present invention relates to a current limit circuit which establishes a control signal that limits motor current as a function of motor speed in such manner as to closely follow the actual commutation limit curve of the motor. The current limit circuit includes an analog divider circuit which receives a signal indicative of motor speed and the circuit produces an output signal proportional to a preselected constant divided by motor speed.

A general object of the invention is to more accurately limit motor current to its commutation limit over the entire operating speed of the motor. At low motor speeds the commutation current limit remains fixed at a relatively high value, but as motor speed increases, the current limit is reduced along a hyperbolic, constant horsepower, curve which very closely tracks the curves published by motor manufacturers.

Another object of the invention is to reduce the number of adjustments required to accurately match the current limit curve to that published by the motor manufacturer. Resistor values can be adjusted to alter the preselected constant and to thereby match the curve to that published by the manufacturer. A single potentiometer can then be adjusted to tailor the system to any specific motor within the same family of motors.

The foregoing and other objects and advantages of the invention will appear from the following description. In the description, reference is made to the accompanying drawings which form a part hereof, and in which there is shown by way of illustration a preferred embodiment of the invention. Such embodiments does not necessarily represent the full scope of the invention, however, and reference is made therefore to the claims herein for interpreting the scope of the invention.

DESCRIPTION OF THE PREFERRED EMBODIMENT

Figure 1:
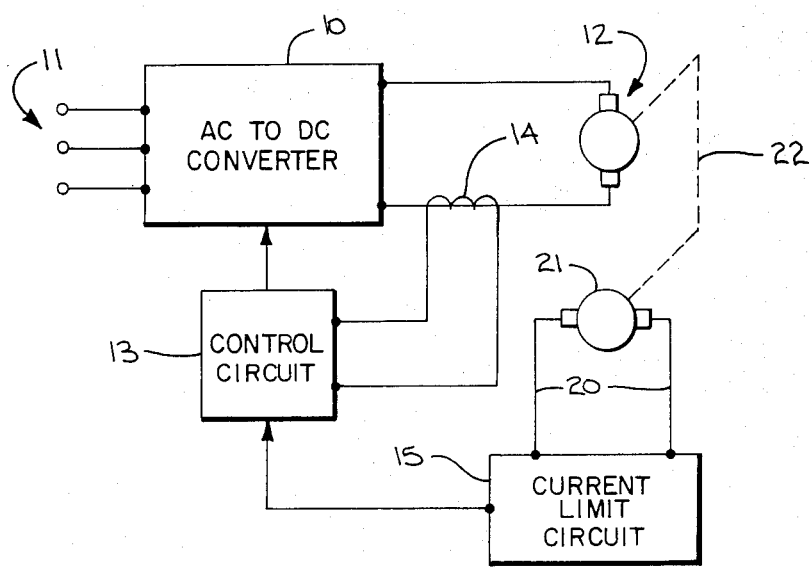
FIG. 1 is a block diagram of a motor control system which employs the present invention.

Referring particularly to FIG. 1, a motor drive system includes an AC to DC converter 10 which produces a dc voltage and current from three-phase ac power lines 11. The magnitude of the dc current supplied to a dc motor 12 is determined by a control circuit 13 which produces a current control signal for the AC to DC converter. The control circuit 13 receives a current feedback signal from a current sensor 14 and it receives a current limit signal from a current limit circuit 15. There are numerous converters 10 and control circuits 13 known in the art and the present invention may be employed with any of them. A power converter and control circuit such as that disclosed in copending U.S. patent application Ser. No. 463,072 which was filed on Feb. 2, 1983, and which is entitled "Digital Power Converter" is preferred and is incorporated herein by reference. The current limit signal produced by the present invention is employed as a clamp which limits the magnitude of the current command signal produced by the control circuit 13.

Figure 2:
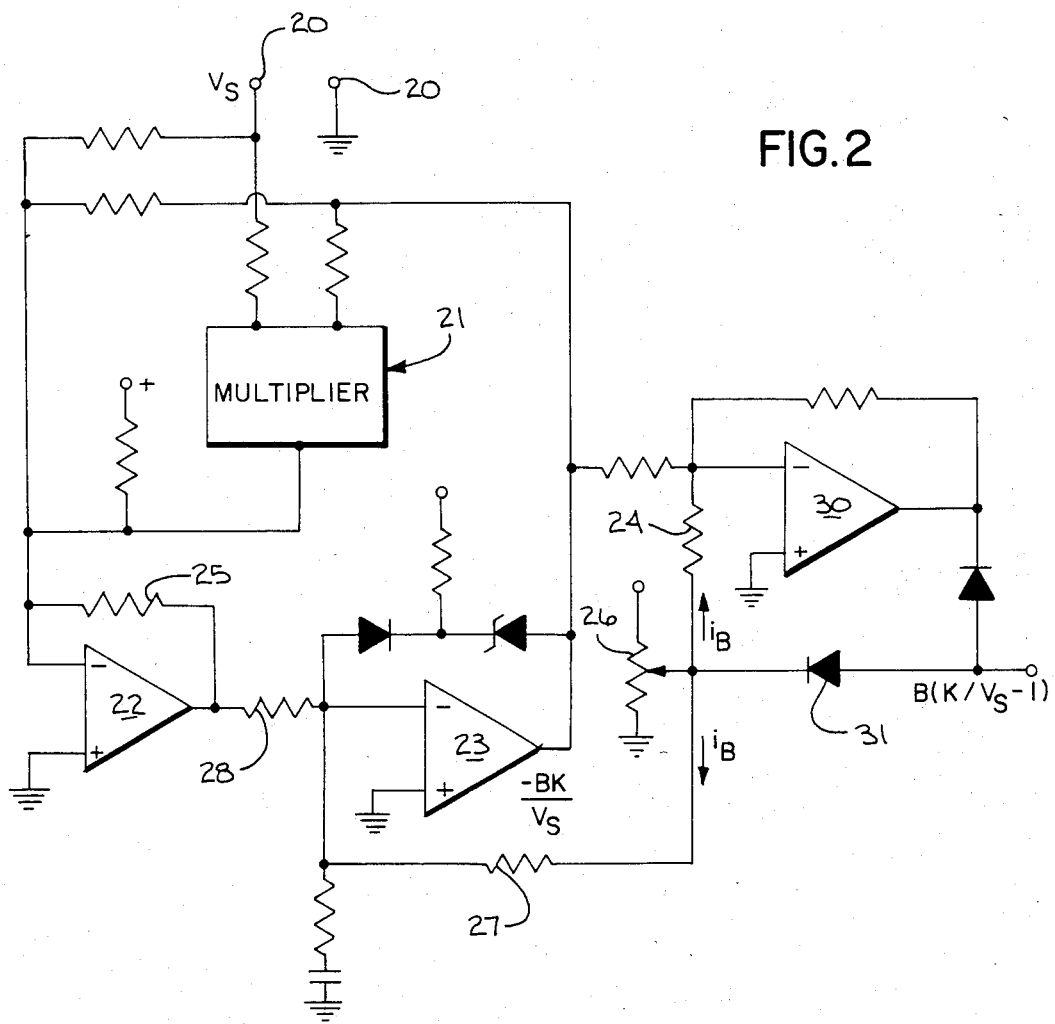
FIG. 2 is an electrical schematic diagram of the current limit circuit which forms part of the system of FIG. 1.
Figure 3:
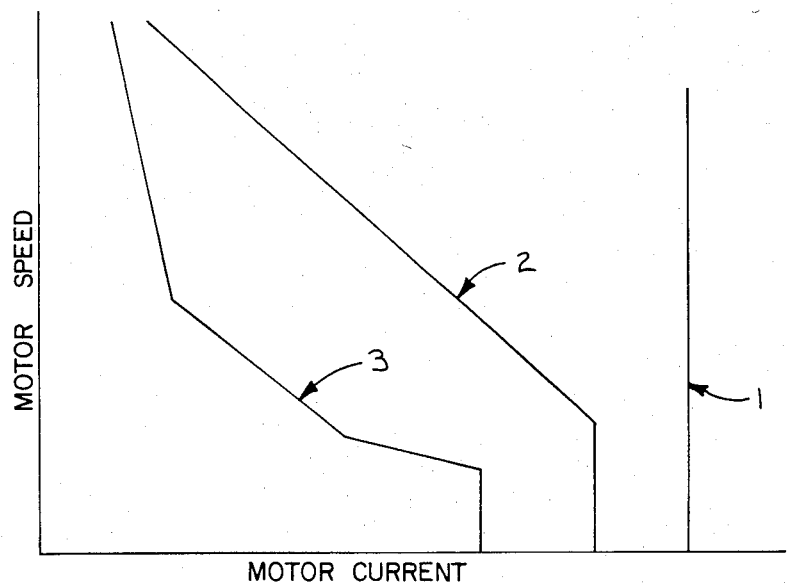
FIG. 3 is a graphic representation of motor current limits established by prior art motor controls.

Referring particularly to FIGS. 1 and 2, the current limit circuit 15 receives a signal indicative of motor speed through leads 20 which connect to a tachometer 121. The tachometer 121 is mechanically linked to the rotor of the motor 12, as indicated by dashed line 122, and the dc voltage ($V_s$) produced across the leads 20 is proportional to motor speed.

The speed signal $V_s$ is applied as one input to an analog divider circuit comprised of an analog multiplier 21, an operational amplifier 22 and an operational amplifier 23. The speed signal $V_s$ is one input to the multiplier 21 and the output of the analog divider circuit ($-BK/V_s$) at the output of amplifier 23 is the second input to the multiplier 21. The output of the multiplier circuit 21 is applied to the operational amplifier 22 which operates as an inverter and buffer. The output of amplifier 22 is coupled to the inverting input of operational amplifier 23 through a coupling resistor 28, and it is fed back to its own input through feedback resistor 25.

The second input to the analog divider circuit is a current $i_B$ which is produced by a voltage $V_B$ at the slider of a potentiometer 26. This current $i_B$ is couplied through a resistor 27 to the inverting input of operational amplifier 23. The output ($-BK/V_s$) of the analog divider circuit varies as an inverse function of motor speed ($V_s$). The constant B is determined by the magnitude of the current $i_B$ and the constant K is determined by a number of factors including the value of feedback resistor 25. As will be explained in more detail below, these constants may be adjusted to configure the circuit for a particular family of motors.

The output of the analog divider circuit is applied to the inverting input of an operational amplifier 30. The current $i_B$ is also applied to this input through a resistor 24, and the output of the amplifier 30 is a voltage $B(K/V_s-1)$ which serves as the current limit signal to the control circuit. A diode 31 clamps this output to the voltage $V_B$, and as will be described below, this provides a convenient means for reducing the peak allowable motor current when the drive circuit is employed with smaller motors in the same family.

Figure 4:
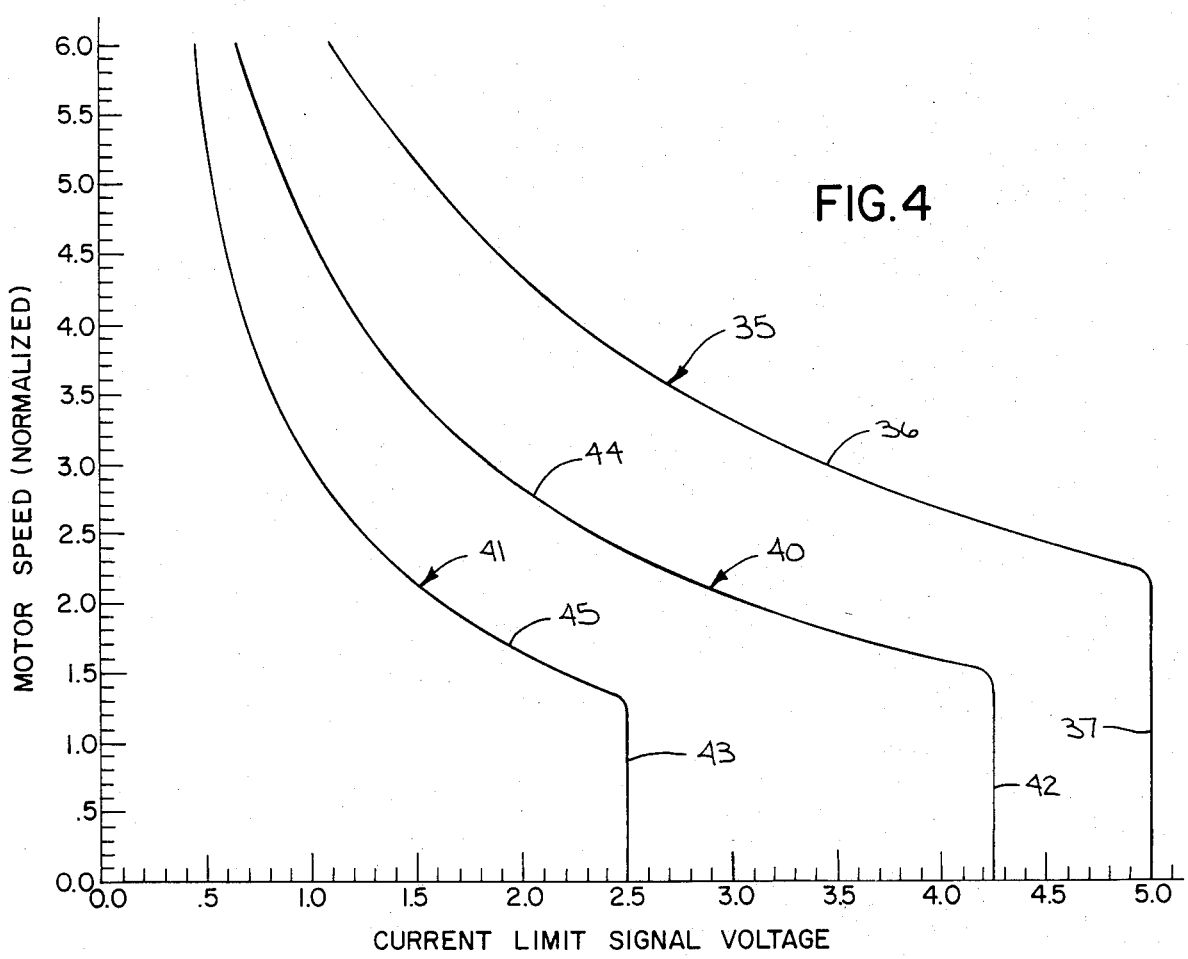
FIG. 4 is a graphic representation of the motor current limit established by the present invention.

Referring particularly to FIG. 4, a current limit signal 35 produced by the circuit of FIG. 2 is comprised of a curved, "constant power" segment 36 and a linear, "constant current" segment 37. The linear segment 37 is produced by the clamping action of the diode 31 and the potentiometer 26 is set to produce a maximum of 5 volts output at low motor speeds. The constant horsepower segment 36 of the curve 35 is produced by the analog divider circuit and operational amplifier 30, and as motor speed increases, the current limit signal decreases along this path. The shape of this curve 35 can be adjusted to match the commutation current limit curves provided by the motor manufacturer. For example, the potentiometer 26 is set to provide an upper limit of 5 volts when the current in a motor rated at 20 amperes reaches 50 amperes (250% rated current). The values of resistors 25 and (24 and 27 changed together) are then adjusted to shape the curve to match those provided by the manufacturer. The adjustment of resistors 24 and 27 affects "B" in the output signal and this allows the horizontal location of the constant horsepower segment 36 to be adjusted. The adjustment of resistor 25 affects "K" in the output signal and this allows the vertical location of the segment 36 to be adjusted. It should be apparent to those skilled in the art that these adjustments are not independent of each other and that some tilting, or rotation, of the segment 36 also occurs.

Once the manufacturer's commutation current limit curve has been matched for the largest motor in a family, it is very easy to adjust the circuit for other motors. More specifically, the potentiometer 26 is adjusted to limit the peak current to 250% of the motor's rated current. Referring to FIG. 4, for example, by reducing the voltage $V_B$ produced by the potentiometer 26, the current limit signal indicated by curve 40 is produced for a 15 ampere motor. And further reduction of the voltage $V_B$ produces the current limit signal indicated by curve 41 for a 10 ampere motor. In each case, the respective constant current segments 42 and 43 limit peak current to 250% of rated motor current, and the respective constant power segments 44 and 45 are shifted to the left a corresponding amount.

It should be apparent that many modifications can be made to the preferred embodiment of the invention without departing from the spirit of the invention. For example, the speed input signal $V_s$ can be derived in a number of ways and the specific circuits can be changed to accommodate different multipliers. In the preferred embodiment an RC4200 analog multiplier manufactured by Raytheon Corporation is used and TL084 operational amplifiers manufactured by Texas Instruments, Inc. are used.

I claim:

1. In a motor drive system which includes a control circuit that produces a current command signal to a converter that controls the magnitude of the current applied to a motor, the improvement therein comprising:

means coupled to the motor for producing a signal ($V_s$) proportional to motor speed;

means for producing a reference signal ($V_B$);

an analog divider circuit having a divisor input connected to receive the speed signal ($V_s$) and a dividend input connected to receive the reference signal ($V_B$), the analog divider circuit being operable to produce an output signal proportional to the ratio of these signals ($V_B/V_s$); and an output amplifier connected to receive the reference signal ($V_B$) and the output of the analog divider circuit ($V_B/V_s$) and being operable to produce a current limit signal to the control circuit which is proportional to the difference between these signals ($V_B/V_s - V_B$).

2. The improvement as recited in claim 1 in which the reference signal producing means is coupled to the output of the output amplifier to inhibit the current limit signal to a magnitude determined by the magnitude of the reference signal ($V_B$).

3. The improvement as recited in claim 1 in which the analog divider circuit includes an operational amplifier which provides a gain (K) to the circuit's output signal ($KV_B/V_s$) and a corresponding gain in the current limit signal ($KV_B/V_s - V_B$).

4. The improvement as recited in claim 3 in which the magnitude of the reference signal ($V_B$) and the magnitude of the gain (K) are adjustable to match the current limit signal magnitude to the commutation current limits of the motor over the motor's operating speed range.

* * * * *